(12) United States Patent
Van Kalken

(10) Patent No.: US 11,428,203 B2
(45) Date of Patent: Aug. 30, 2022

(54) WIND TURBINE BLADE COMPRISING TWO BLADE PARTS AND AN AERODYNAMIC SLEEVE

(71) Applicant: LM Wind Power US Technology ApS, Kolding (DK)

(72) Inventor: Jordy Hertel Nilsson Van Kalken, Lunderskov (DK)

(73) Assignee: LM WIND POWER US TECHNOLOGY APS, Kolding (DK)

( * ) Notice: Subject to any disclaimer, the term of this patent is extended or adjusted under 35 U.S.C. 154(b) by 42 days.

(21) Appl. No.: 16/467,180

(22) PCT Filed: Dec. 7, 2017

(86) PCT No.: PCT/EP2017/081787
§ 371 (c)(1),
(2) Date: Jun. 6, 2019

(87) PCT Pub. No.: WO2018/104429
PCT Pub. Date: Jun. 14, 2018

(65) Prior Publication Data
US 2019/0383262 A1    Dec. 19, 2019

(30) Foreign Application Priority Data
Dec. 7, 2016  (EP) .................................. 16202616

(51) Int. Cl.
*F03D 1/06*    (2006.01)
(52) U.S. Cl.
CPC ...... *F03D 1/0675* (2013.01); *F05B 2240/302* (2013.01)

(58) Field of Classification Search
CPC .......... F05B 2240/121; F05B 2240/122; F05B 2240/132; F05B 2240/302; F03D 1/0675; F03D 1/0683; F03D 80/30; Y02E 10/721
See application file for complete search history.

(56) References Cited

U.S. PATENT DOCUMENTS 9,523,279 B2 * 12/2016 Herr ....................... F03D 1/0675
2011/0142636 A1 * 6/2011 Curtin .................. F03D 1/0658
416/62

(Continued)

FOREIGN PATENT DOCUMENTS

| EP | 3139032 A1 * | 3/2017 | ............ F03D 13/10 |
| GB | 2527035 A | 12/2015 | |
| WO | WO-2013060722 A1 * | 5/2013 | ........... F03D 1/0675 |

*Primary Examiner* — Woody A Lee, Jr.
*Assistant Examiner* — Jesse M Prager
(74) *Attorney, Agent, or Firm* — Nath, Goldberg & Meyer; Jerald L. Meyer; Tanya E. Harkins

(57) ABSTRACT

This invention relates to a sleeve and a modular wind turbine blade comprising such a sleeve. The modular wind turbine blade comprises a first blade and a second blade section, wherein the two blade sections are joined together to form a joint interface having a number of adjoining end lines located in the outer surfaces. A sleeve is positioned over the joint interface and connected to both the first and second blade sections. The body of the sleeve extends over the adjoining end lines and protects them from environmental and external impacts. The sleeve further comprises a number of airflow modifying elements projecting from the outer surface of the sleeve. The airflow modifying elements may be stall fences.

16 Claims, 5 Drawing Sheets

(56) References Cited

U.S. PATENT DOCUMENTS

| | | | |
|---|---|---|---|
| 2011/0142642 A1* | 6/2011 | McGrath | F03D 1/065 |
| | | | 416/135 |
| 2011/0243736 A1 | 10/2011 | Bell | |
| 2011/0293432 A1* | 12/2011 | Hibbard | F03D 13/10 |
| | | | 416/223 R |
| 2015/0176564 A1* | 6/2015 | Kumar | F03D 1/0641 |
| | | | 416/236 R |
| 2018/0266388 A1* | 9/2018 | Hallissy | F03D 1/0675 |

\* cited by examiner

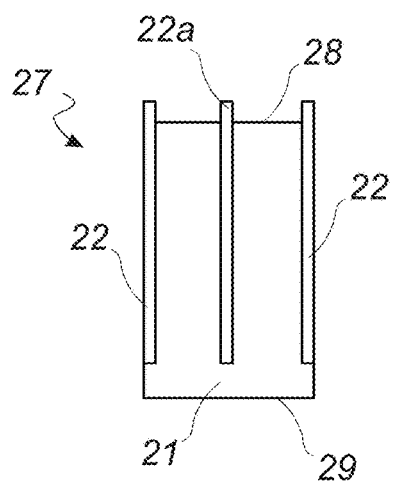
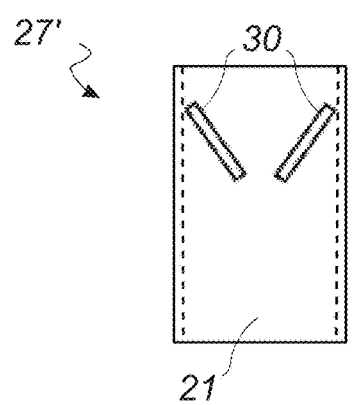
Fig. 6　　　Fig. 7
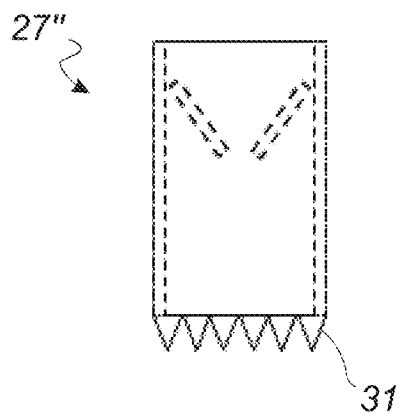
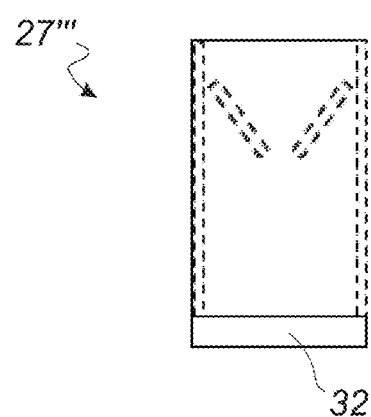
Fig. 8　　　Fig. 9
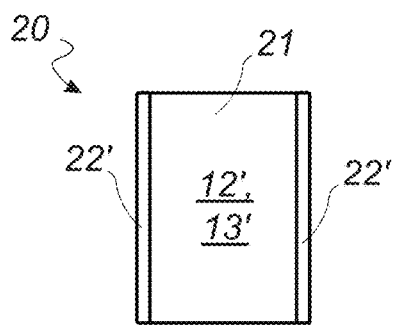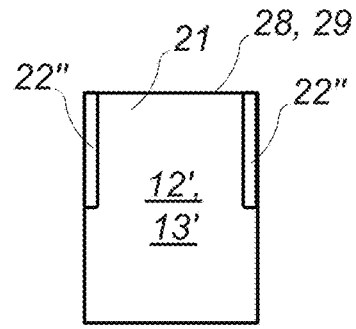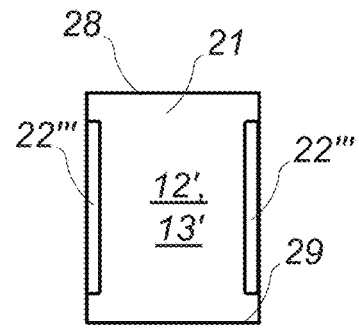
Fig. 10　　Fig. 11　　Fig. 12

WIND TURBINE BLADE COMPRISING TWO BLADE PARTS AND AN AERODYNAMIC SLEEVE

This is a National Phase Application filed under 35 U.S.C. 371 as a national stage of PCT/EP2017/081787, filed Dec. 7, 2017, an application claiming the benefit of European Application No. 16202616.5, filed Dec. 7, 2016, the content of each of which is hereby incorporated by reference in its entirety.

TECHNICAL FIELD

The present invention relates to a sleeve for installation on a modular wind turbine blade, wherein the sleeve comprises a body having a predetermined length, width and thickness and a number of airflow modifying elements projecting from an outer surface of the sleeve body.

The present invention further relates to a modular wind turbine blade with the abovementioned sleeve positioned over the joint interface.

BACKGROUND

Wind turbine blades for modern wind turbines have in recent years increased in size and weight which, in turn, have resulted in an increase in the rated or maximum capacity of the modern wind turbines. This has resulted in increased complexity and costs of transporting and installing such large wind turbine blade, particularly due to the restrictions and limitations for road transports. Such large wind turbine blades also require the use of large manufacturing moulds during the manufacturing process. As the aerodynamic blade profile is often customised for a particular application and/or installation size, the moulds are often designed with a unique aerodynamic shape with a specific chord distribution and a specific longitudinal length. Changing the aerodynamic profile, chord length or longitudinal length often requires a new unique mould or a modular based mould comprising interchangeable mould sections.

Various examples of modular wind turbine blades are disclosed in the literature. An example of manufacturing a modular wind turbine blade is disclosed in WO 2015/189338 A1, wherein the tip section is manufactured separately from the rest of the wind turbine blade subsequently aligned and joined together with the other blade section. In one embodiment, the tip section and the other blade section each comprises a recess formed in the laminate at the joining end, wherein the two recesses combined form a single continuous recess extending along the entire circumference at the joint interface. An overlapping laminate is arranged in the combined recess and adhered to each blade section using resin to form a scarf joint.

This overlapping laminate forms two separate glue lines in the outer surface of the blade shell. The glue lines are exposed to environmental and other external impacts, like ducts, ice, moisture, lightning strikes and the likes. Secondly, these exposed glue line may crack or even brake off due to the strain and stresses at this joining interface during operation or in extreme load situations, thereby enabling moisture to enter the laminate or even the interior of the modular wind turbine blade. This solution requires the joining ends to have relative small tolerances in order to form a strong bond and a flushed outer surface.

In alternative embodiments of WO 2015/189338 A1, a plurality of individual scarf segments can be used to join the blade sections together. However, this increases the number of exposed glue lines, thus further increasing the risk of a structural failure in these glue lines. Secondly, there is an increased risk of delamination in the scarf segments due the strain and stresses during operation or in extreme load situations. Thirdly, the scarf segments each require individual recesses to be formed in the laminate of the respective the blade sections, thereby significantly increasing the complexity of the lay-up process and thus total the manufacture time. This alternative solution requires a very precise formation of the two joining ends, otherwise, additional grinding or sanding is required which could weaken the structural strength of this scarf joint.

An alternative solution is disclosed in US 2010/0132884 A1, wherein the scar cap of the inner blade section is coupled to the spar cap of the outer blade section via a scarf joint. When joining the two blade sections together, doubler plates mounted in the outer blade section are brought into contact with sealing pads mounted in the inner blade section. A foam or tape is placed on the outer surface of the two blade section to seal off the scarf joint. An adhesive is then pumped into the cavity of the scarf joint via a number of injection ports located in the inner blade section.

The use of stall fence or stall barriers to reduce airflows along the blade surface in the longitudinal direction are well-known. Previously, the stall fences have mainly been designed for placement around the surface area comprising maximum chord length, or alternative near the blade root. The stall fences can optionally also be placed at the outer half of a conventional wind turbine blade as disclosed in US 2015/0017008 A1.

It have also been proposed to arrange the stall fence within the pitch junction of a partial pitch wind turbine blade, such as disclosed in WO 2012/113400 A2. In this solution, the stall fence is arranged in the spacing between the inner and outer blade section to at least partly cover this spacing. This stall fence extends along the pressure side, the leading edge and the suction side, but not the trailing edge. The teachings state that this solution is specifically designed for use on partial pitch wind turbine blades.

GB 2527035 discloses a wind turbine blade segment connected to a metallic tip end part, wherein a protective sleeve is arranged over the joint interface. A central fin extends along the pressure side and a further central fin extends along the suction side of the sleeve. The height of each central fin tapers from a maximum height at its leading edge to a minimum height at its trailing edge. The sleeve is made of polyurethane or a rubber type polymeric material. The thickness of the sleeve is selected to provide a relative rigid structure which in turns provides an acceptable level of protection. The sleeve has two end surfaces which extend in the chordwise direction and project from the original blade surface. These end surfaces causes an abrupt change in the spanwise airflow which, in turns, reduces the aerodynamic performance.

OBJECT OF THE INVENTION

An object of the invention is to provide a wind turbine blade and a sleeve that solves the abovementioned problems.

Another object of the invention is to provide a wind turbine blade and a sleeve that allows for an improved protection of the exposed glue lines at the joint interface.

Yet another object of the invention is to provide a wind turbine blade and a sleeve that allows for a greater flexibility when joining the two blade section together.

Another further object of the invention is to provide a wind turbine blade and a sleeve that allows for increased structural strength at the joint interface.

DETAILED DESCRIPTION OF THE INVENTION

An object of the invention is achieved by a sleeve for installation on a modular wind turbine blade, the modular wind turbine blade comprising a first blade section and at least a second blade section each extending in a chordwise direction and a longitudinal direction, the first blade section comprises a first joint end and the at least second blade section comprises at least a second joint end, wherein the first and second joint ends, when joined together, define a joint interface extending in the chordwise direction, wherein said joint interface comprises a number of adjoining end lines located in at least one first outer surface of the first and second blade sections, the sleeve has a body with an aerodynamic profile, the body has an inner surface and a second outer surface extending from a first end to a second end, the body further extends from a local leading edge to a local trailing edge, wherein the inner surface of said body is configured to extend over the joint interface, when installed, so that the body covers said number of adjoining end lines, characterised in that a first airflow modifying element and a second airflow modifying element projects outwards from the second outer surface, wherein the first airflow modifying element extends along the first end and the second airflow modifying element extends along the second end.

Here, the term "adjoining end lines" defines any adjoining or adjacent peripheral edges of the first outer surface located directly between the two blade sections. This term also includes any adjoining or adjacent peripheral edges between the first outer surface of one blade section and a corresponding first outer surface of an overlapping laminate or connecting sleeve arranged in the joint interface.

Here, the term "sleeve" defines an element extending substantially around the outer circumference of the wind turbine blade at the joint interface. This term includes any elements extending around the entire outer circumference, including the trailing and leading edges. This term also includes any elements extending from the trailing edge to the leading edge on both the pressure side and the suction side.

This provides improved protection of the joint interface, since the respective end lines are covered by the body of the sleeve and thus shielded against environmental and other external impacts. This also allows for greater flexibility when joining the two blade section together compared to conventional assembly methods. The joint end of the respective blade sections and optionally the overlapping laminate or connecting sleeve can thereby be manufactured and/or milled with greater tolerances, thereby reducing the total cycle time and potentially also reducing number of method steps required.

The present sleeve can be manufactured separately from the modular wind turbine blade and subsequently installed on the modular wind turbine blade during or after assembling the first and second blade sections. The sleeve can thus be manufactured using any suitable manufacturing technique, e.g. extrusion, pultrusion or moulding. Alternatively, the sleeve can be manufactured after the first and second blade sections have been joined. Once jointed, at least one overlapping laminate is arranged over the joint interface after which a resin is applied and cured to form the sleeve. The overlapping laminate may extend along the entire circumference of the joint interface or at least two overlapping laminates may be combined so that they extend along the entire circumference of the joint interface.

The present sleeve is particularly suited for any modular wind turbine blades having a longitudinal length equal to or greater than 35 meters, preferably equal to or greater than 50 meters.

When installed, the abovementioned sleeve is positioned on the first outer surface of the modular wind turbine blade, i.e. the first and second blade sections, wherein the inner surface of the sleeve is facing the first outer surface of the two blade sections. The first end of the sleeve faces towards the first blade section, e.g. the blade root or an opposite end of that blade section. The second end of the sleeve faces towards the second blade section, e.g. the blade tip or an opposite end of that blade section. The body of the sleeve advantageously extends over any adjoining end lines and optionally also any access holes and/or mounting holes used to join the two blade sections together. This enables the sleeve to cover any openings formed in the first outer surface at joint interface, thereby providing an improved surface protection.

In conventional assembly methods, the joint interface is normally grinded and polished or smoothened to form a flushed continuous first outer surface after which a final coating or paint is applied. However, the coating or paint is subjected to erosions and wear during operation thereby exposing the end lines and the access or mounting holes. This problem is eliminated by use of the present sleeve.

The present sleeve further comprises a number of airflow modifying elements arranged on the second outer surface, wherein said airflow modifying elements project outwards from the second outer surface. Preferably, a first airflow modifying element is arranged at the first end and a second airflow modifying element is arranged at the second end. The first and second airflow modifying elements are configured to restrict the spanwise airflow over the modular wind turbine blade in the longitudinal direction and delay airflow separation. This reduces the adverse aerodynamic effects of the sleeve and enhances the aerodynamic performance of the modular wind turbine blade. This may also reduce the undesirable effects of the developed tip vortex, if the sleeve is located towards the tip end.

Conventional connecting sleeves or flexible fairings does not allow for the installation of airflow modifying elements at the joint interface due to their structure and composition. Although the sleeve of GB 2527035 A has a projecting aerodynamic fin, the spanwise airflow still has to pass over the projecting end surfaces of the sleeve body before reaching this central fin. This in turns has an adverse effect on the aerodynamic performance of the wind turbine blade and reduces the effect of the central fins on the spanwise airflow.

According to one embodiment, at least the first or second airflow modifying element has a local length, wherein said local length is between 50% to 100% of a chord length of said body or of said modular wind turbine blade.

The first and second airflow modifying elements have a local length measured along the first and second ends of the body respectively. Alternatively, the local length is measured parallel to the chord line of the wind turbine blade. The airflow modifying elements further have a height measured perpendicularly from the second outer surface to a local top. Each airflow modifying element additionally has a local width measured between opposite facing side surfaces perpendicularly to the local length.

The local length may be advantageously between 50% to 100% of the chord length of the wind turbine blade or the sleeve. The chord length may be measured at the lengthwise installation position of the sleeve on the wind turbine blade. Preferably, the local length may be between 60% to 90%, e.g. 75%, of the chord length. This provides an optimal configuration of the airflow modifying elements.

The airflow modifying element may have any suitable cross-sectional profile, such as a substantially rectangular profile, a substantially triangular profile, a semi-circular profile or a semi-elliptical profile. Other cross-sectional profiles may be used. This allows for an optimal performance of the airflow modifying elements.

The airflow modifying element may have two opposite facing free ends in the chordwise direction. The airflow modifying element may extend along the entire local chord length of the sleeve and thus the free ends may be arranged at the local leading and trailing edges of the sleeve, respectively. Alternatively, the airflow modifying element may extend partly along the local chord line of the sleeve, wherein one free end of the sleeve may be arranged at the local leading or trailing edge and the other free end may face the opposite edge of the sleeve. This allows for an optimal positioning of the airflow modifying elements on the wind turbine blade.

At least one airflow modifying element may be arranged on the local pressure side while at least one other airflow modifying element may be arranged on the local suction side. The airflow modifying elements on the local pressure and suction sides may be aligned or offset along the local chord line. This also allows for an optimal positioning of the airflow modifying elements on the wind turbine blade.

According to one embodiment, at least the first or second airflow modifying element further extends around at least one of the local leading and trailing edges.

The airflow modifying element may alternatively extend over at least one of the local leading and trailing edges. In this configuration, the airflow modifying element may further extend partly or fully on the local pressure and suction sides of the body of the sleeve. Alternatively, the airflow modifying element may extend further along the local pressure side than on the local suction side, or vice versa. The free ends may in this configuration both face in the same chordwise direction. This allows the airflow modifying element to at least partly influence the spanwise airflow on both the pressure and suction sides of the wind turbine blade.

According to one embodiment, at least the first or second airflow modifying element extends along the circumference of said body.

The airflow modifying element may alternatively extend over the entire circumference of the body of the sleeve and thus along the circumference of the wind turbine blade. This allows the airflow modifying element to influence the spanwise airflow on both the pressure and suction sides of the wind turbine blade.

According to one embodiment, a number of intermediate airflow modifying elements and/or a number of vortex generators is arranged between the first and second airflow modifying elements.

The above first and second airflow modifying elements may be combined with a number of intermediate airflow modifying elements arranged between the first and second ends. These intermediate airflow modifying elements may extend parallel to or be angled relative to the first or second airflow modifying element. This is suited for relative wide sleeves. For example, but not limited to, the sleeve may comprise one, two, three, or more intermediate airflow modifying elements. This also allows for the installation of airflow modifying elements at the joint interface regardless of type of joint used.

The intermediate airflow modifying elements may have the same configuration as the first and second airflow modifying elements or a different configuration. The height and/or the length of the intermediate airflow modifying elements may be different from or the same as the height and/or length of the first or second airflow modifying element. This restricts any local spanwise airflow between the first and second airflow modifying elements.

Alternatively or additionally, the first and second airflow modifying elements may be combined with a number of vortex generators arranged on the second outer surface. The vortex generators may be arranged a chordwise position between the local leading edge and the local trailing edge. The vortex generators may have a substantially rectangular, triangular or semi-circular profile in its length direction. One or more arrays of vortex generators may be arranged between the first and second ends. For example, but not limited to, the sleeve may comprise one, two, three, or more vortex generators. This allows the aerodynamic performance of the wind turbine blade to be enhanced.

The sleeve may also comprise only the first and second airflow modifying elements and no further airflow modifying elements or vortex generators arranged there in between. This is suitable for relative narrow sleeves.

According to one embodiment, the first and second airflow modifying elements, the intermediate airflow modifying elements and/or the vortex generators have a substantially uniform height in the chordwise direction or a height that tapers from a local second edge to a local first edge.

The above airflow modifying elements may have a constant or variable height along their length. For example, the height may taper from the local trailing edge to the local leading edge, or vice versa. For example, the height may taper from a local first edge to a local second edge, or vice versa. For example, the airflow modifying elements may have a maximum height located between the local trailing and leading edges or the local first and second edges. This provides an optimal configuration of the airflow modifying elements.

Additionally or alternatively, the above vortex generators may have a constant or variable height along their length. For example, the height may taper from a local first edge to a local second edge, or vice versa. The vortex generators may thus have a maximum height measured at the local first or second edge. This provides an optimal configuration of the vortex generators.

According to one embodiment, the sleeve further comprises a number of noise reducing elements or a trailing edge extender extending along the local trailing edge.

In a special configuration, the first and second airflow modifying elements may be combined with a number of noise reducing elements arranged at the local second edge. The noise reducing elements may be shaped as serrations extending along the local second edge. The noise reducing elements may project form the local second edge and be aligned with the local airflow direction passing over the body of the sleeve. For example, but not limited to, the sleeve may comprise one, two, three, four or more noise reducing elements. This allows the noise reducing elements to extend over the sleeve to form a continuous array along the trailing edge of the wind turbine blade. This mitigates the vortices generated behind the trailing edge and reduces the trailing edge noise of the modular wind turbine blade.

The first and second airflow modifying elements may also be combined with a trailing edge extender arranged at the local second edge. The trailing edge extender may be shaped as a continuous plate element extending along the local second edge and projecting from the local second edge of the sleeve. The plate element may optionally comprise one or more perforations or through openings arranged in its side surfaces. This allows the performance of the modular wind turbine blade to be enhanced.

The trailing edge extender may be configured as a flexible element capable of bending when subjected to wind loads or as a substantially rigid element capable of substantially maintaining its original shape. The trailing edge extender may be integrated formed as part of the body of the sleeve and/or the first and second airflow modifying elements. Alternatively, the trailing edge extender may be attached to the body of the sleeve and/or the first and second airflow modifying elements via any suitable attachment techniques, e.g. welding, glue, bolts, screws or the like.

According to one embodiment, at least the first and second airflow modifying elements are flexible elements configured to bend in the chordwise direction and/or the longitudinal direction when installed.

One or more of the above airflow modifying elements, e.g. the stall fences, may be made of a flexible or elastomeric material, such as rubber, polymer, polycarbonate or thermoplastics. Alternatively, the airflow modifying element may have a deformable or flexible structure capable of bending when subjected to wind loads. The deformable or flexible properties of the airflow modifying element may be selected dependent on the particular application, the aerodynamic characteristics of the modular wind turbine blade and/or the longitudinal position of the sleeve. The airflow modifying element may also be made of substantially rigid material, such as glass or carbon reinforced materials.

In example, the airflow modifying element may comprise a deformable or flexible part and a rigid part, wherein the deformable or flexible part is configured to bend relative to the rigid part. In an alternative example, the airflow modifying element may be made of different materials having different flexible or elastomeric properties. In another alternative example, the airflow modifying element may have different deformable or flexible parts with different deformable or flexible properties.

The body of the sleeve is shaped so that its inner surface substantially follows the outer surface of the modular wind turbine blade, i.e. the first outer surface. The outer surface of the body, i.e. the second outer surface, is shaped to form a smooth aerodynamic profile. This aerodynamic profile may correspond to the aerodynamic profile of the blade segments. Alternatively, the second outer surface of the sleeve may form an aerodynamic profile that differs from the blade segments. This reduces the amount of turbulent airflow over the joint interface and increases the overall aerodynamic performance of the wind turbine blade.

Some conventional sleeves in the form of overlapping laminates suffer from significant surface roughness due to the tolerances of the respective items and the glue lines in the joint interface. Other conventional sleeves, as in US 2011/0243736 A1, have a connecting metal sleeve bolted to both blade segments which also suffer from significant surface roughness. Conventional metal sleeves may also interfere with the local lightning protection system. This problem is eliminated using the present sleeve, since the body of the sleeve forms a smooth outer surface.

The modular wind turbine blade has a blade thickness measured between the two opposite facing first outer surfaces, i.e. the pressure side and the suction side of the modular wind turbine blade. This blade thickness can be determined as function of the chord length of the modular wind turbine blade, i.e. the blade chord length. This blade chord length further can be determined as function of the longitudinal length of the modular wind turbine blade.

When installed, the sleeve increases the overall thickness at the joint interface as the overall thickness can be measured between two opposite facing second outer surfaces, i.e. the local pressure side and the local suction side of the body of the sleeve. The sleeve may have the same chord length as the modular wind turbine blade or an increased chord length since the body of the sleeve may extend over the trailing edge and/or the leading edge of the modular wind turbine blade.

The sleeve body thickness to blade chord length and/or the sleeve body length to blade chord length ratio may be selected dependent on the aerodynamic profile of the modular wind turbine blade and/or the longitudinal position of the sleeve. Said sleeve body length is measured between the inner surface and the second outer surface along the chord line. Said sleeve body thickness is measured between the inner surface and the second outer surface perpendicular to the chord line, e.g. at the point of maximum blade thickness.

According to one embodiment, the body is formed by a single continuous element or comprise at least two body parts which combined define the body.

The body has a chord length measured along the chordwise direction of the modular wind turbine blade, a width measured along the longitudinal direction of the modular wind turbine blade, and a thickness measured between the second outer surface and the inner surface. The length, width and/or thickness may be selected dependent on the aerodynamic profile of the modular wind turbine blade and/or the longitudinal position on the modular wind turbine blade. In example, but not limited to, the body has an aerodynamic profile in the chordwise direction and a straight profile in the longitudinal direction. In example, but not limited to, the body has a first aerodynamic profile in the chordwise direction and a second aerodynamic profile in the longitudinal direction.

The body may be formed by a single continuous element or a plurality of body parts, e.g. sub-elements, which together forms the body of the sleeve. In example, the body may extend continuously along the entire circumference of the modular wind turbine blade and thus form a single element.

In an alternative example, the body may extend at least from the trailing edge to the leading edge of the modular wind turbine blade. A first body part may thus be positioned on the pressure side and a second body part may thus be positioned on the suction side. The first and second body parts may be brought into contact with each other, or spaced apart, at the trailing and leading edges respectively.

In another alternative example, the first and second body part may be positioned over the trailing and leading edges. The first and second body parts may be brought into contact with each other, or spaced apart, at the pressure and suction sides respectively. Optionally, at least one intermediate body part may be positioned between the first and second body parts. This at least one intermediate body part may contact one or both body parts.

In yet another alternative example, the body may extend along the pressure side, over both the trailing and leading edges and further partly along the suction side so that its opposite ends are facing each other. The opposite ends may thus be brought into contact with each other, or spaced apart.

Alternatively, the opposite ends may be arranged on the suction side, at the trailing edge, or at the leading edge instead.

According to one embodiment, the body is a flexible body configured to substantially adapt to outer contours of said first and second blade sections and/or said joint interface.

The sleeve may have a substantially rigid body, wherein the abovementioned adhesive layer is capable of adapting to any surface roughness or variations in the surface contour. This further allows for a strong bond between the sleeve and the modular wind turbine blade.

Alternatively, the body of the sleeve may be made of a flexible or elastomeric material or have a deformable or flexible structure. The body may be made of thermoplastics, polycarbonate, polymer or another suitable material. This further allows the sleeve to adapt to any surface roughness or variations in the surface contour. This also allows the sleeve to follow the bending of the respective blade sections when subjected to wind loads and gravity loads.

The airflow modifying elements, the vortex generators, the noise reducing elements and/or the trailing edge extender may also be made of a fibre reinforced material impregnated with resin. The fibres may be made of glass, carbon or aramid.

According to one embodiment, at least one recess is formed in the inner surface of the sleeve, wherein said at least one recess is configured to receive and hold at least one adhesive tape or film and/or a fluid adhesive.

The inner surface of the body of the sleeve may comprise a number of recesses for receiving and holding an adhesive used to adhere the sleeve to the first and second blade sections. The inner surface may further comprise a peripheral wall and optionally intermediate walls defining the recess areas. Alternatively, the recesses may be omitted and the adhesive may be applied to the entire inner surface. In example, but not limited to, the inner surface may a single recess or a plurality of individual recesses.

The adhesive may be an adhesive tape of film, e.g. a double sided adhesive tape or film, which can be applied before or during installation of the sleeve. At least one peeloff layer may be used to protect the adhesive during storage which is then removed just before adhering the sleeve to at least one of the blade sections. Alternatively, the adhesive may be a fluid adhesive, e.g. methyl methacrylate adhesives (MMA), which can be applied during installation of the sleeve. A pressure may then be applied to the sleeve and any excess adhesive pushed out between the inner surface and the first outer surface may be removed. This allows for a strong bond between the sleeve and the modular wind turbine blade.

According to one embodiment, the sleeve further comprises a number of through holes arranged in the body which extend from the second outer surface to the inner surface, e.g. the at least one recesses, wherein the through holes are configured to be partly or fully filled with a fluid adhesive when installed.

Additionally or alternatively, the sleeve may further comprise a plurality of through holes arranged in the body. The through holes may extend from the second outer surface to the inner surface, e.g. into the recesses formed in the inner surface. The through holes may be formed during manufacturing of the sleeve, or during installation, e.g. by drilling. This allows any excess adhesive to be pushed out of these through holes and then removed. Additionally, adhesive may be applied to the inner surface or recesses via said through holes before applying pressure to the sleeve. This also allows for a strong bond between the sleeve and the modular wind turbine blade.

In a particular configuration, the adhesive tape of film may be applied to the inner surface of the peripheral and intermediate walls while the fluid adhesive may be applied to the recesses between these peripheral and intermediate walls. This increases the bonding properties between the sleeve and the modular wind turbine blade.

The airflow modifying elements may be installed on the body of the sleeve in the same manner as described above. This allows the airflow modifying elements to be replaced. Alternatively, the airflow modifying elements may be formed as an integrated part of the body of the sleeve. This reduces the amount of work and ensures the strength of the airflow modifying elements. If the airflow modifying elements form part of the body, any voids or cavities formed directly below these elements in the inner surface may be filled with fluid adhesive during installation, e.g. via through holes in the body. Alternatively, said voids or cavities may be used to add flexibility to the airflow modifying elements.

As the present sleeve extends over the joint interface and is connected to both the first and second blade sections, the sleeve also functions as a reinforcement sleeve increasing the structural strength of the joint interface. This reduces the need for adding additional layers to the main laminate and to the rest of the blade shell at both joint ends of the blade sections. This also eliminates the need for adding a reinforcement plate or bulkhead at the both joint ends in order to achieve the necessary structural strength.

In a further alternative, the body of the sleeve and/or the airflow modifying elements may be installed by means of fasteners, such as bolts or screws.

According to one embodiment, said first and second airflow modifying elements and/or said intermediate airflow modifying elements are shaped as stall fences.

The first and second airflow modifying elements may preferably be shaped to function as stall fences. Further, the intermediate airflow modifying elements may also be shaped to function as stall fences. This restricts the spanwise airflow and delay the airflow separation over the modular wind turbine blade.

The profile and dimensions of the stall fences, the vortex generators, the noise reducing elements and/or the trailing edge extender may be selected dependent on the geometrical dimensions and aerodynamic profile of the first and second blade sections.

An object of the invention is also achieved by a modular wind turbine blade, the modular wind turbine blade comprising a first blade section and at least a second blade section each extending in a chordwise direction and a longitudinal direction, the first blade section comprises a first joint end and the at least second blade section comprises at least a second joint end, wherein the first and second joint ends, when joined together, define a joint interface extending at least in the chordwise direction, wherein said joint interface comprises a number of adjoining end lines located in at least one first outer surface of the first and second blade sections, characterised in that a sleeve as defined above is positioned at the joint interface so that said number of adjoining end lines in the first outer surface are covered by the body of said sleeve.

The inner blade section may, in example but not limited to, be a main blade section and the outer blade section may be a tip end section. The modular wind turbine blade alternatively comprise more than two blade sections which are joined together, wherein a sleeve as described above is positioned over each joint interface.

The first and second joint ends may be jointed together via a scarf joint, a butt joint or a splice joint. Said joint may be arranged in at least the main laminate, the trailing edge or the leading edge. The joint may further extend along the rest of the blade shell and thus along the entire circumference of the first and second blade sections.

The first and second joint ends may further each comprise at least one recess formed in at least the main laminate, preferably in the entire laminate of the blade shell, wherein the at least one recess is configured to receive and hold at least one overlapping laminate. The gap between the adjacent laminates in the main laminate and/or blade shell may be filled with a resin or adhesive which, when cured, forms at least two glue lines extending into the first outer surface. These glue lines are then covered and protected using the present sleeve.

As described earlier, this overlapping laminate may be covered by separate overlapping laminate which forms the sleeve. A glue line may thus be formed between these two laminates. Alternatively, the two overlapping laminates may be integrated into a single overlapping laminate which forms the sleeve as well as fill up the recess. This may in turn reduce the total number of glue lines.

As described earlier, the present sleeve may also function as a reinforcement sleeve increasing the structural strength of the joint interface. This allows the main laminate and/or the laminate of the blade shell to substantially maintain their local thickness, thereby saving material and weight of the modular wind turbine blade.

The first and second blade sections may alternatively be joined via a connecting sleeve which is mounted using a plurality of integrated bushings and mounting bolts. The blade shell at the first and second joint ends may be increased in thickness to hold the bushings, however, this increases the total weight of the modular wind turbine blade.

The above sleeve may comprise any combination of stall fences, vortex generators, trailing edge extenders and/or noise reducing elements. This reduces the negative effects of the modular wind turbine blade both structurally as well as aerodynamically. This allows for a better control of the airflow at joint interface and thereby an improved aerodynamic performance and annular energy production.

The sleeve may be positioned on the first outer surface so that the first and second airflow modifying elements extends substantially perpendicularly relative to the longitudinal direction of the modular wind turbine blade. Alternatively, the sleeve and thus the first and second airflow modifying elements may be positioned at a predetermined angle relative to the longitudinal direction. The first and second airflow modifying elements may have a substantially straight or curved profile in the chordwise direction.

DESCRIPTION OF DRAWINGS

The invention is explained in detail below with reference to embodiments shown in the drawings, in which FIG. 6 shows a third embodiment of the sleeve with array of stall fences, FIG. 7 shows a four embodiment of the sleeve with vortex generators, FIG. 8 shows a fifth embodiment of the sleeve with noise reducing elements, FIG. 9 shows a sixth embodiment of the sleeve with a trailing edge extender, FIGS. 10-12 show three alternative embodiments of the sleeve.

LIST OF REFERENCES

Figure 1:
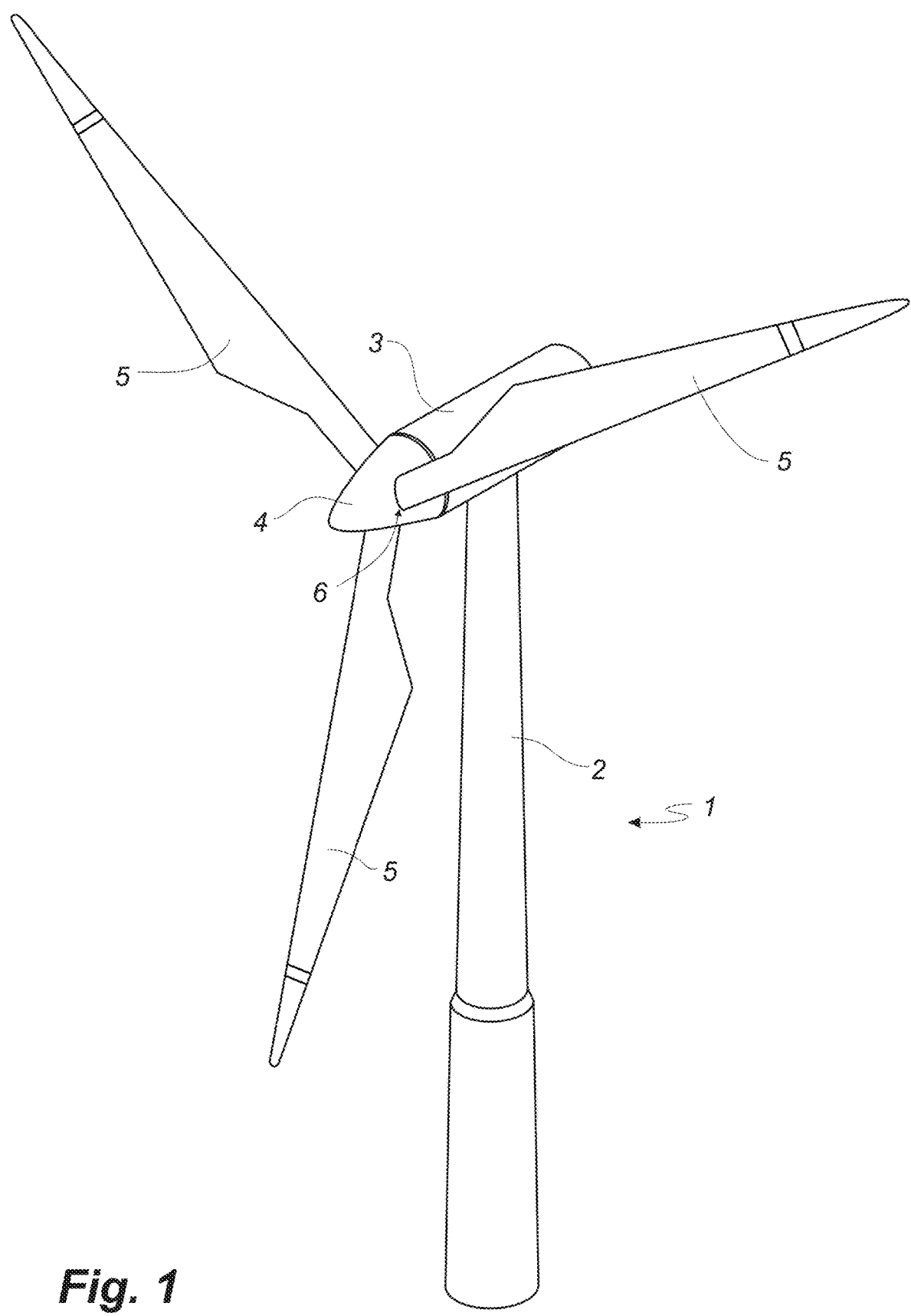
FIG. 1 shows a wind turbine.

1. Wind turbine
2. Wind turbine tower
3. Nacelle
4. Hub
5. Wind turbine blades
6. Pitch bearing
7. Blade root
8. Tip end
9. Leading edge
10. Trailing edge
11. Blade shell
12. Pressure side
13. Suction side
14. Blade root portion
15. Aerodynamic blade portion
16. Transition portion
17. First blade section
18. Second blade section
19. Joint interface
20. Sleeve
21. Body
22. Stall fences
22a. Intermediate stall fences
23. Inner surface
24. Second outer surface
25. First end
26. Second end
27. Sleeve
28. Leading edge of sleeve body
29. Trailing edge of sleeve body
30. Vortex generators
31. Noise reducing elements
32. Trailing edge extender
33. Main laminate
34. Shear web
35. Overlapping laminate
36. Adjoining end lines
37. Sleeve
38. Recess
39. Peripheral walls
40. Through holes The listed reference numbers are shown in abovementioned drawings where no all reference numbers are shown on the same figure for illustrative purposes. The same part or position seen in the drawings will be numbered with the same reference number in different figures.

DETAILED DESCRIPTION OF THE DRAWINGS

FIG. 1 shows a modern wind turbine 1 comprising a wind turbine tower 2, a nacelle 3 arranged on top of the wind turbine tower 2, and a rotor defining a rotor plane. The nacelle 3 is connected to the wind turbine tower 2 via a yaw bearing unit. The rotor comprises a hub 4 and a number of wind turbine blades 5, here three wind turbine blades are shown. The rotor may comprise a smaller or greater number of wind turbine blades 5. The hub 4 is connected to a drive train located in the nacelle 3 via a rotation shaft.

The hub 4 comprises a mounting interface for each wind turbine blade 5. A pitch bearing unit 6 is optionally connected to this mounting interface and further to a blade root of the wind turbine blade 5.

Figure 2:
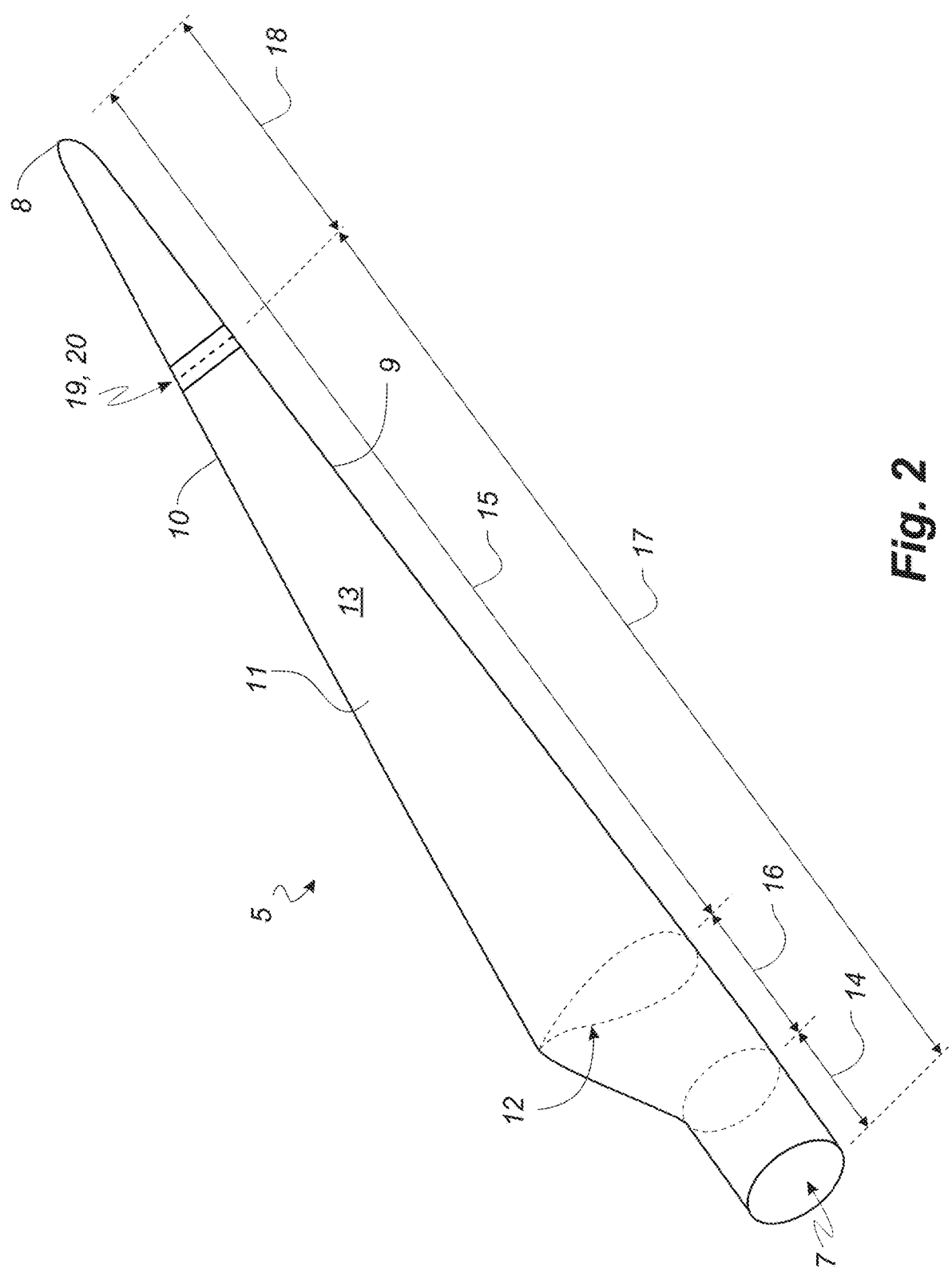
FIG. 2 shows an exemplary embodiment of the wind turbine blade.

FIG. 2 shows a schematic view of the wind turbine blade 5 which extends in a longitudinal direction from a blade root 7 to a tip end 8. The wind turbine blade 5 further extends in a chordwise direction from a leading edge 9 to a trailing edge 10. The wind turbine blade 5 comprises a blade shell 11 having two opposite facing first outer surfaces defining a pressure side 12 and a suction side 13 respectively. The blade shell 11 further defines a blade root portion 14, an aerodynamic blade portion 15, and a transition portion 16 between the blade root portion 14 and the aerodynamic blade portion 15.

The blade root portion 14 has a substantially circular or elliptical cross-section (indicated by dashed lines). The blade root portion 14 together with a load carrying structure, e.g. a main laminate combined with a shear web or a box beam, are configured to add structural strength to the wind turbine blade 5 and transfer the dynamic loads to the hub 4. The load carrying structure extends between the pressure side 12 and the suction side 13 and further in the longitudinal direction.

The blade aerodynamic blade portion 15 has an aerodynamically shaped cross-section (indicated by dashed lines) designed to generate lift. The cross-sectional profile of the blade shell 11 gradually transforms from the circular or elliptical profile into the aerodynamic profile in the transition area 16.

The wind turbine blade 5 is a modular wind turbine blade comprising a first blade section 17 and a second blade section 18. Here the first blade section 17 is shown as a main blade section and the second blade section 18 is shown as a tip end section. The wind turbine blade 5 may comprise a greater number of blade sections. The first and second blade sections 17, 18 are joined together at a joint interface 19. The joint interface 19 is covered by a sleeve 20. This increases the adaptability of the wind turbine blade 5 and reduces the complexity and costs of transporting and handling of the wind turbine blade 5.

Figure 3:
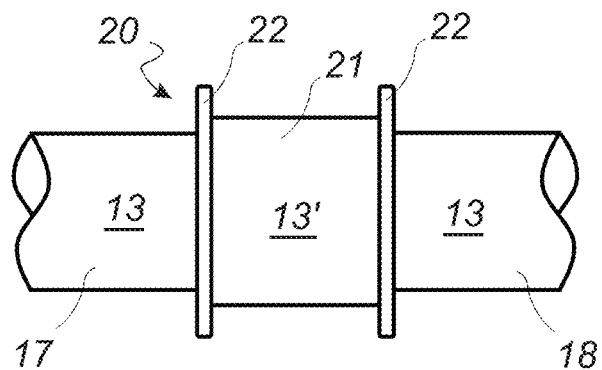
FIG. 3 shows a first embodiment of the sleeve according to the invention with two stall fences.
Figure 4:
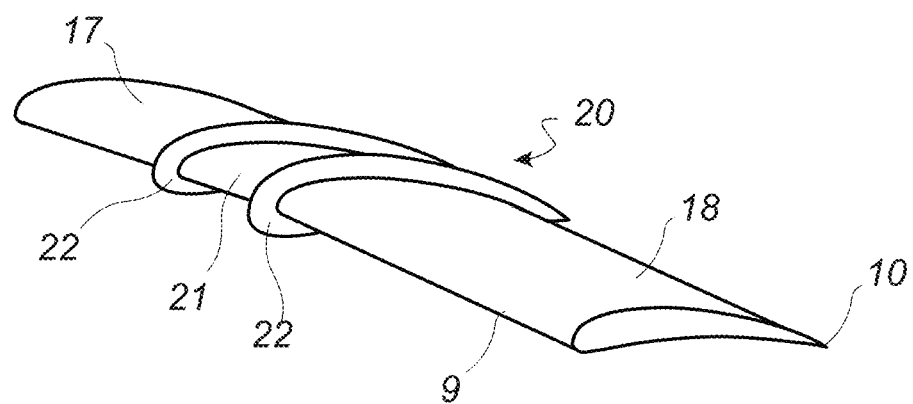
FIG. 4 shows a perspective view of the sleeve of FIG. 3.

FIGS. 3 and 4 show a first embodiment of the sleeve 20 installed on the wind turbine blade 5 at the joint interface 19. The sleeve 20 comprises a body 21 and a number of airflow modifying elements. The body 21 is a flexible element extending along the entire circumference of the first and second blade sections 17, 18. The body 21 has a second outer surface defining a local pressure side, a local suction side 13', a local leading edge (shown in FIG. 6) and a local trailing edge (shown in FIG. 6).

As indicated in FIGS. 3 and 4, the airflow modifying elements are here illustrated as stall fences 22 extending in the chordwise direction. The stall fences 22 extend along the local pressure (shown in FIG. 5) and suction sides 13' and further over both the local leading and trailing edges. In this first embodiment, a stall fence 22 is arranged at either ends of the body 21. This reduces the tip losses and tip vortices.

In an alternative embodiment, the sleeve 20 may comprise only the body 21 and thus no airflow modifying elements, as shown in FIG. 10.

Figure 5:
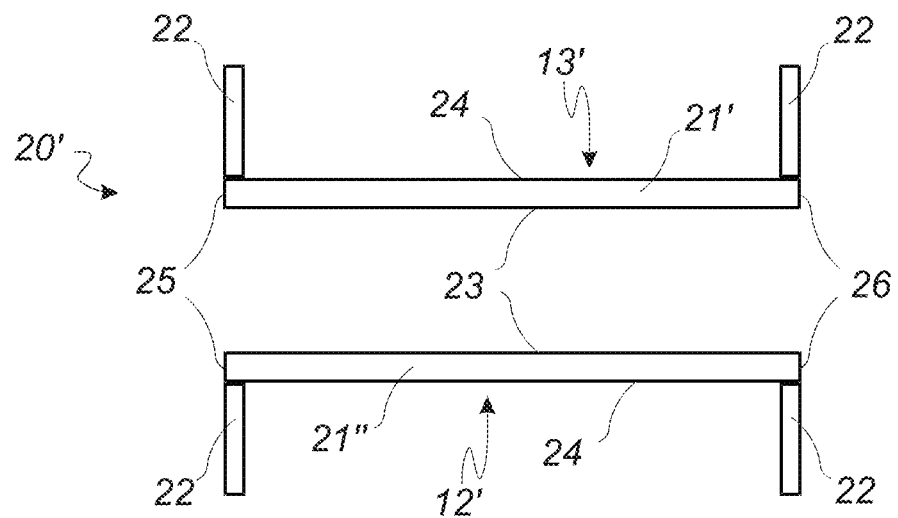
FIG. 5 shows a cross-section of a second embodiment of the sleeve with two body parts.

FIG. 5 shows a cross-section of a second embodiment of the sleeve, wherein the sleeve 20' comprises a number of body parts 21', 21" which together defines the body of the sleeve 20'. Here two body parts are shown. But the sleeve 20' may comprise a smaller or greater number of body parts.

The body, e.g. the body parts 21', 21", has a first end 25 facing the blade root 7 and a second end 26 facing the tip end 8. The width of the body is measured between the first and second ends 25, 26.

The body, e.g. the body parts 21', 21", further has an inner surface 23 facing the pressure and suction sides 12, 13 of the wind turbine blade 5, respectively. The body, e.g. the body parts 21' 21", has a second outer surface 24 forming a local pressure side 12' and a local suction side 13', respectively. The length of the body is measured between a local leading edge (shown in FIG. 6) and a local leading edge (shown in FIG. 6) parallel to the chord line of the wind turbine blade 5. The thickness of the body is measured between the inner surface 23 and the second outer surface 24 perpendicularly to the chord line.

Figure 15:
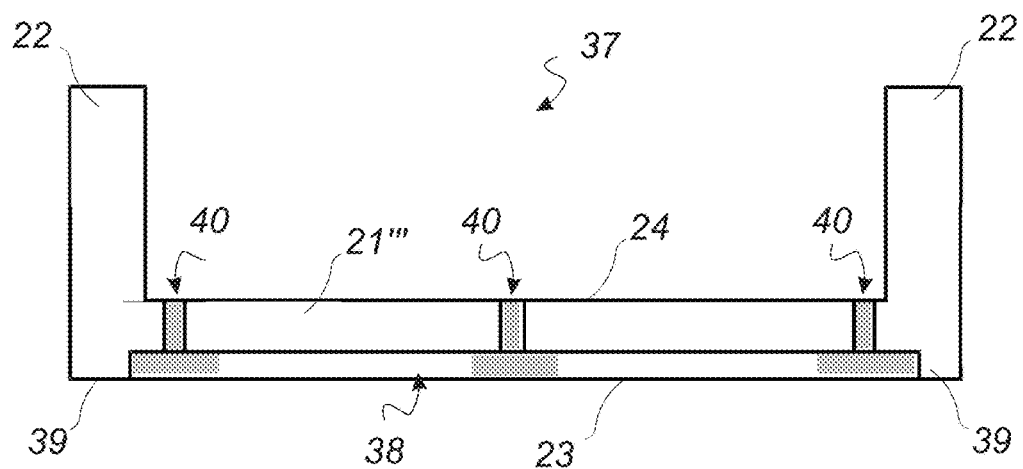
FIG. 15 shows a seventh embodiment of the sleeve with a recess for receiving adhesive and through holes for applying said adhesive.

As indicated in FIG. 5, the airflow modifying elements, e.g. the stall fences 22, are separate elements which are installed on the body of the sleeve 20'. The airflow modifying elements, e.g. the stall fences 22, can also be integrally formed together with the body of the sleeve 20, as indicated in FIG. 15.

FIG. 6 shows a third embodiment of the sleeve, wherein the sleeve 27 comprises a number of intermediate stall fences 22a arranged between the first and second stall fences 22. Here three stall fences are illustrated, but the sleeve may comprise a greater number of stall fences.

The stall fences 22, 22a extend along a part of the local pressure side 12', over the local leading edge 28 and further along a part of the local suction side 13'. The free ends of the stall fences 22, 22a are placed at a distance from the local trailing edge 29.

FIG. 7 shows a four embodiment of the sleeve, wherein the sleeve 27' comprises an array of airflow modifying elements shaped as vortex generators 30. The vortex generators 30 are arranged in pairs as illustrated in FIG. 7. Here two vortex generators are illustrated, but the sleeve may comprise a greater number of vortex generators.

FIG. 8 shows a fifth embodiment of the sleeve, wherein the sleeve 27" comprises an array of airflow modifying elements shaped as noise reducing elements 31. The noise reducing elements 31 are formed as serrations arranged at the local trailing edge 29. Here six serrations are illustrated, but the sleeve may comprise a smaller or greater number of serrations.

FIG. 9 shows a sixth embodiment of the sleeve, wherein the sleeve 27''' comprises an airflow modifying element shaped as a trailing edge extender 32. The trailing edge extender 32 is arranged at the local trailing edge 29 has a length substantially corresponding to the width of the sleeve 27".

The trailing edge extender 32 may simple be a flexible or rigid plate shaped element installed on or integrated into the body 21 of the sleeve 27".

The first and second airflow modifying elements, e.g. stall fences 22, can be combined with any one of the embodiments of FIGS. 6-9 (indicated by dashed lines) for further enhancing the aerodynamic effect and/or reducing trailing edge noise.

FIGS. 10-12 show three alternative embodiments of the sleeve 20 wherein the stall fences 22 extend partly along the circumference of the body 21.

In FIG. 10, the stall fence 22' extends along the local suction side 13' and the free ends thereof are terminated at the local leading and trailing edges 28, 29. The stall fence 22' thus has a length substantially equal to the length of the body 21.

In FIG. 11, the stall fence 22" extends partly along the local suction side 13' and has a length of about 50% of the chord length of the body 21. Here, the stall fence 22" is arranged at the local leading or trailing edge 28, 29 and extends towards the opposite edge.

In FIG. 12, the stall fence 22" extends partly along the local suction side 13' and has a length of about 75% of the chord length of the body 21. Here, the stall fence 22" is arranged a chordwise position between the local leading and trailing edges 28, 29.

Figure 13:
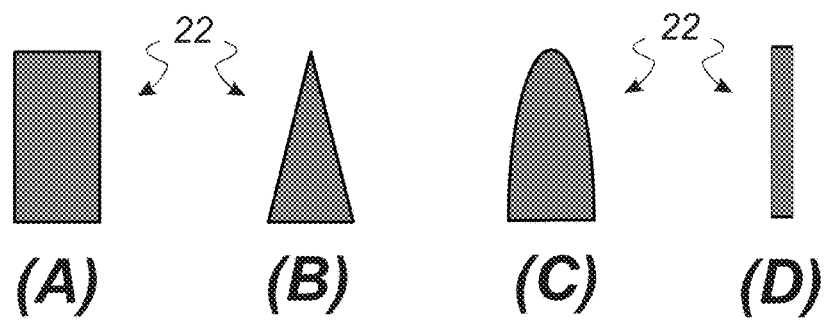
FIGS. 13a-d show various cross-sectional profiles of the airflow modifying elements.

FIGS. 13a-d show various cross-sectional profiles of the airflow modifying elements, e.g. the stall fences 22. The stall fences 22 can have a substantially rectangular cross-sectional profile as indicated in FIGS. 13a and 13d. The stall fence 22 can be relative wide, as indicated in FIG. 13a, or relative narrow, as indicated in FIG. 13d.

The stall fence 22 can also have a substantially triangular cross-sectional profile, e.g. a scalene or equilateral triangular profile as indicated in FIG. 13b. Further, the stall fence 22 can also have a semi-circular or semi-elliptical cross-sectional profile as indicated in FIG. 13c.

Figure 14:
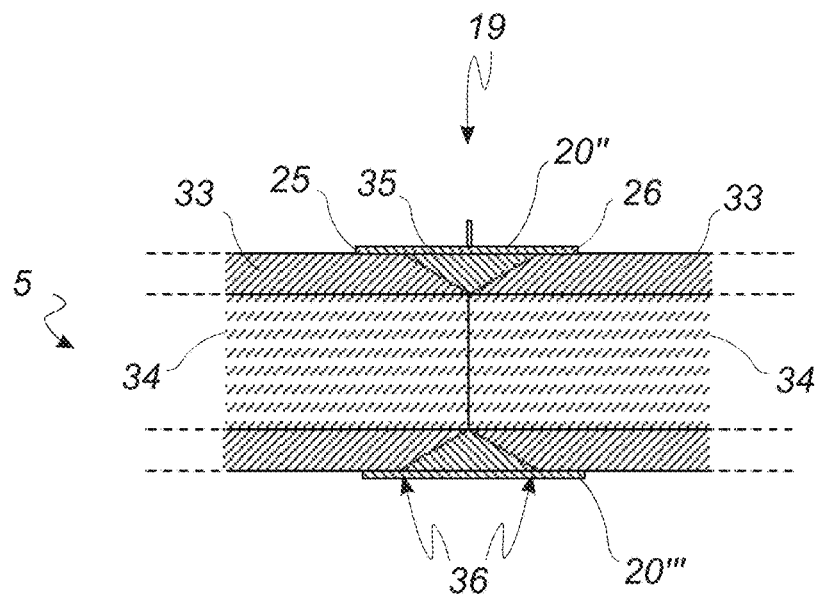
FIG. 14 shows an exemplary embodiment of the joint interface.

FIG. 14 shows an exemplary embodiment of the joint interface 19 of the wind turbine blade 5. The blade shell 11 of the first and second blade sections 17, 18 comprises a main laminate arranged between the trailing edge 10 and the leading edge 9 and extending in the longitudinal direction. For illustrative purposes, only a cross-section of the load carrying structure is shown.

The load carrying structure comprises a main laminate 33 arranged at the two opposite facing first outer surfaces 26 of the first and second blade sections 17, 18. One or more shear webs 34 are extending between the two main laminates 33. The load carrying structure adds stiffness to the first and second blade sections 17, 18.

Each joint ends of the first and second blade sections 17, 18 comprises a recess formed in at least the main laminate 33, wherein the recess is arranged in the first outer surface 26. When the joint ends are brought into contact with each other, the recesses form a combined recess in which an overlapping laminate 35 is arranged. A resin is applied to the gaps between the overlapping laminate 35 and the main laminate 33 and cured to form a scarf joint as illustrated in FIG. 10.

The scarf joint forms two adjoining end lines 36 in the form of two glue lines extending in at least the chordwise direction. These adjoining end lines 36 are covered by the sleeve 20' when it is installed on the wind turbine blade 5. Here, the sleeve 20 comprises just the body 21 and no airflow modifying elements. Alternatively, the sleeve 20' may comprise only one airflow modifying element as illustrated. For illustrative purposes, the sleeves 20, 20' are only shown on one side of the wind turbine blade.

FIG. 15 shows a seventh embodiment of the sleeve, wherein the body 21''' of the sleeve 37 comprises a recess 38 for receiving and holding an adhesive (marked by grey colour) used to adhere the sleeve 37 to the wind turbine blade 5. The recess 38 is arranged in the inner surface 23 and enclosed by peripheral walls 39 of the body 21''.

The body 21''' further comprises a number of through holes 40 extending between the inner surface 23 and the second outer surface 24. Here, three through holes are shown, but the sleeve 37 may comprise a smaller or greater number of through holes.

The adhesive may be a fluid adhesive applied through the trough holes 40. Any excess adhesive can be pushed back through the holes 40 and then removed. The adhesive may also be an adhesive tape or film arranged in the recess 38, wherein the free surface of the adhesive tape or film projecting outwards from the inner surface 23.

The abovementioned embodiments may be combined in any combinations without deviating from the present invention.

The invention claimed is:

1. A modular wind turbine blade, comprising:
a first blade section (17) and at least a second blade section (18), each extending in a chordwise direction and a longitudinal direction, wherein the first blade section (17) comprises a first joint end and the at least second blade section (18) comprises at least a second joint end, wherein the first and second joint ends, when joined together, define a joint interface (19) extending in the chordwise direction, wherein said joint interface (19) comprises a number of adjoining end lines (36) located in at least one first outer surface of the first and second blade sections (17, 18); and
a sleeve (20) comprising a body (21) with an aerodynamic profile, the body (21) having an inner surface (23) and a second outer surface (24) extending from a first end (25) to a second end (26), wherein the body (21) further extends from a local leading edge (28) to a local trailing edge (29), wherein the inner surface (23) of said body (21) extends over the joint interface (19), so that the body (21) covers said number of adjoining end lines (36),
wherein a first airflow modifying element (22) protrudes from the second outer surface (24) at the first end (25) of the sleeve (20) and extends along the first end (25), and
a second airflow modifying element (22) protrudes from the second outer surface (24) at the second end (26) of the sleeve (20) and extends along the second end (26),
wherein the sleeve (20) has spanwise-opposed first and second sides positioned about the joint interface (19), the first airflow modifying element (22) protruding from the body (21) at and along the first side of the sleeve (20) and the second airflow modifying element (22) protruding from the body (21) at and along the second side of the sleeve (20), and
wherein the first flow modifying element (22) extends parallel to the first end (25), the second flow modifying element (22) extends parallel to the second end (26), and the sleeve (20) is arranged such that the first end (25) of the sleeve (20), the first flow modifying element (22), the second end (26) of the sleeve (20) and the second flow modifying element (22) are each aligned in the chordwise direction.

2. The modular wind turbine blade according to claim 1, wherein at least the first or second airflow modifying element (22) has a local length, wherein said local length is between 50% to 100% of a chord length of said body (21) or of said modular wind turbine blade.

3. The modular wind turbine blade according to claim 1, wherein at least the first or second airflow modifying element (22) further extends around at least one of the local leading and trailing edges (28, 29).

4. The modular wind turbine blade according to claim 3, wherein at least the first or second airflow modifying element (22) extends along the circumference of said body (21).

5. The modular wind turbine blade according to claim 1, wherein a number of intermediate airflow modifying elements (22*a*) and/or a number of vortex generators (30) is arranged between the first and second airflow modifying elements (22).

6. The modular wind turbine blade according to claim 5, wherein the first and second airflow modifying elements (22), the intermediate airflow modifying elements (22*a*) and/or the vortex generators (30) have a uniform height in the chordwise direction or a height that tapers from a local second edge to a local first edge.

7. The modular wind turbine blade according to claim 1, wherein the sleeve further comprises a number of noise reducing elements (31) or a trailing edge extender (32) extending along the local trailing edge (29).

8. The modular wind turbine blade according to claim 1, wherein at least the first and second airflow modifying elements (22) are flexible elements configured to bend in the chordwise direction and/or the longitudinal direction when installed.

9. The modular wind turbine blade according to claim 1, wherein the body (21) is formed by a single continuous element or comprise at least two body parts (21', 21") which combined define the body (21).

10. The modular wind turbine blade according to claim 1, wherein the body (21) is a flexible body configured to adapt to outer contours of said first and second blade sections (17, 18) and/or said joint interface (19).

11. The modular wind turbine blade according to claim 1, wherein at least one recess (38) is formed in the inner surface (23) of the sleeve (20), wherein said at least one recess (38) is configured to receive and hold at least one adhesive tape or film and/or a fluid adhesive.

12. The modular wind turbine blade according to claim 11, wherein the sleeve further comprises a number of through holes (40) arranged in the body (21''') which extend from the second outer surface (24) to the inner surface (23), wherein the through holes (40) are configured to be partly or fully filled with a fluid adhesive when installed.

13. The modular wind turbine blade according claim 5, wherein said first and second airflow modifying elements (22) and/or said intermediate airflow modifying elements (22*a*) are shaped as stall fences.

14. A modular wind turbine blade, comprising:
 a first blade section (17) and at least a second blade section (18) each extending in a chordwise direction and a longitudinal direction, wherein the first blade section (17) comprises a first joint end and the at least a second blade section (18) comprises at least a second joint end, wherein the first and second joint ends, when joined together, define a joint interface (19) extending at least in the chordwise direction, wherein said joint interface (19) comprises a number of adjoining end lines (36) located in at least one first outer surface of the first and second blade sections (17, 18); and
 a sleeve (20) positioned at the joint interface (19), wherein the sleeve (20) comprises:
 a body (21) with an aerodynamic profile, the body (21) having an inner surface (23) and a second outer surface (24) extending from a first end (25) to a second end (26), wherein the body (21) further extends from a local leading edge (28) to a local trailing edge (29), wherein the inner surface (23) of said body (21) extends over the joint interface (19), so that the body (21) covers said number of adjoining end lines (36),
 wherein a first airflow modifying element (22) protrudes from the second outer surface (24) at the first end (25) of the sleeve (20) and extends along the first end (25), and
 a second airflow modifying element (22) protrudes from the second outer surface (24) at the second end (26) of the sleeve (20) and extends along the second end (26),
 wherein the sleeve (20) has spanwise-opposed first and second sides positioned about the joint interface (19), the first airflow modifying element (22) protruding from the body (21) at and along the first side of the sleeve (20) and the second airflow modifying element (22) protruding from the body (21) at and along the second side of the sleeve (20), and
 wherein the first flow modifying element (22) extends parallel to the first end (25), the second flow modifying element (22) extends parallel to the second end (26), and the sleeve (20) is arranged such that the first end (25) of the sleeve (20), the first flow modifying element (22), the second end (26) of the sleeve (20) and the second flow modifying element (22) are each aligned in the chordwise direction.

15. The modular wind turbine blade according to claim 12, wherein the number of through holes (40) extend from the second outer surface (24) to the at least one recess (38).

16. A modular wind turbine blade, comprising:
 a first blade section (17) and at least a second blade section (18), each extending in a chordwise direction and a longitudinal direction, wherein the first blade section (17) comprises a first joint end and the at least second blade section (18) comprises at least a second joint end, wherein the first and second joint ends, when joined together, define a joint interface (19) extending in the chordwise direction, wherein said joint interface (19) comprises a number of adjoining end lines (36) located in at least one first outer surface of the first and second blade sections (17, 18); and
 a sleeve (20) comprising a body (21) with an aerodynamic profile, the body (21) having an inner surface (23) and a second outer surface (24) extending from a first end (25) to a second end (26), wherein the body (21) further extends from a local leading edge (28) to a local trailing edge (29), wherein the inner surface (23) of said body (21) extends over the joint interface (19), so that the body (21) covers said number of adjoining end lines (36),
 wherein a first airflow modifying element (22) protrudes from the second outer surface (24) at the first end (25) of the sleeve (20) and extends along, and continuously about an entirety of, the first end (25), and
 a second airflow modifying element (22) protrudes from the second outer surface (24) at the second end (26) of the sleeve (20) and extends along, and continuously about an entirety of, the second end (26),
 wherein the sleeve (20) has spanwise-opposed first and second sides positioned about the joint interface (19), the first airflow modifying element (22) protruding from the body (21) at and along the first side of the sleeve (20) and the second airflow modifying element (22) protruding from the body (21) at and along the second side of the sleeve (20), and
 wherein the first flow modifying element (22) extends parallel to the first end (25), the second flow modifying element (22) extends parallel to the second end (26), and the sleeve (20) is arranged such that the first end (25) of the sleeve (20), the first flow modifying element (22), the second end (26) of the sleeve (20) and the second flow modifying element (22) are each aligned in the chordwise direction.

\* \* \* \* \*